United States Patent Office 3,153,613
Patented Oct. 20, 1964

3,153,613
TETRA- AND PENTA-METHYL PIPERIDINE ANTI-
HYPERTENSIVE COMPOSITIONS AND THERAPY
William Glynne Moss Jones and Edwin Harry Paterson
Young, Manchester, England, assignors to Imperial
Chemical Industries Limited, London, England, a corporation of Great Britain
No Drawing. Filed Feb. 6, 1958, Ser. No. 713,529
Claims priority, application Great Britain Feb. 13, 1957,
4,907/57
7 Claims. (Cl. 167—65)

This invention relates to new pharmaceutical compositions and more particularly it relates to new pharmaceutical compositions containing piperidine derivatives which have valuable therapeutic properties for example ganglion-blocking or hypotensive properties.

According to the invention we provide new pharmaceutical compositions comprising as active ingredient or ingredients one or more piperidine compounds of the formula:

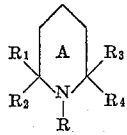

wherein R stands for hydrogen or for a lower alkyl or alkenyl radical which may optionally be substituted, $R_1$ stands for a methyl radical, $R_2$ stands for a methyl or ethyl radical, $R_3$ stands for hydrogen or for a methyl radical, $R_4$ stands for a lower alkyl radical and wherein the ring (A) may optionally bear further substituents, the non-toxic pharmaceutically-acceptable acid addition salts or the quaternary salts thereof in admixture with suitable non-toxic pharmaceutical excipients.

The lower alkyl or alkenyl radical (R) may be for example a methyl, ethyl, allyl, β-hydroxyethyl, β-chloroethyl, n-butyl or a β-acyloxyethyl radical for example a β-acetoxyethyl or a β-(3:4:5-trimethoxybenzoyl)oxyethyl radical.

Furthermore the optional substituents in the ring (A) may be for example an amino radical, a substituted amino radical, such as dialkylaminoalkylamino radical, a lower alkyl radical, a phenyl radical, a cyano radical or a hydroxy radical which may be acylated for example as in the acetoxy radical and the xanthene-9-carbonyloxy radical.

It is also to be understood that the two hydrogen atoms at position 4 of the ring (A) may be substituted by an oxygen atom thus providing the corresponding 4-piperidone derivatives for example 2:2:6:6-tetramethyl-4-piperidone and its salts.

It is further to be understood that the piperidine ring (A) may be partially dehydrogenated thereby providing tetrahydropyridine derivatives containing a double bond in the 3,4 or 4,5 position and optionally containing a lower alkyl radical as substituent in the 4-position. These tetrahydropyridine derivatives are obtainable by dehydration of the corresponding 4-piperidol derivatives.

Suitable acid addition salts of the said piperidine compounds include for example and in particular those salts which are suitable for clinical use. Such salts include for example salts with the common inorganic acids for example hydrochloric acid, sulphuric acid and phosphoric acid or with the common organic acids for example acetic acid, maleic acid, succinic acid, lactic acid, tartaric acid, cinnamic acid and salicylic acid, and salts of less than average solubility in water and/or improved solubility in lipoids for example salts derived from long chain fatty acids such as oleic acid and stearic acid and salts with medicinally useful and compatible acidic compounds.

Particularly valuable quaternary salts formed from the tertiary bases of the above stated formula are for example the methiodides.

As suitable compounds of the above stated formula there may be mentioned for example 1-ethyl-2:2:6:6-tetramethylpiperidine,
1:2:2:6:6-pentamethylpiperidine,
1-β-acetoxyethyl-2:2:6:6-tetramethylpiperidine,
1-β-hydroxyethyl-2:2:6:6-tetramethylpiperidine,
1:1:2:2:6:6-hexamethylpiperidinium iodide,
1-n-butyl-2:2:6:6-tetramethylpiperidine,
1-allyl-2:2:6:6-tetramethylpiperidine,
2:6-diethyl-2:3:6-trimethylpiperidine,
2:2:6:6-tetramethyl-1-β-(3':4':5'-trimethoxybenzoyloxy)ethylpiperidine,
1-ethyl-2:2:6-trimethylpiperidine,
2:2-dimethyl-6-isopropylpiperidine,
1:2:2:6-tetramethylpiperidine,
1-allyl-2:2:6-trimethylpiperidine,
1:1:2:2:6-pentamethylpiperidinium iodide,
2:2-dimethyl-6-ethylpiperidine,
1-β-chloroethyl-2:2:6-trimethylpiperidine,
6-ethyl-1:2:2-trimethylpiperidine,
4-hydroxy-2:2:6-trimethylpiperidine,
1:2:2:6-tetramethyl-4-piperidyl xanthene-9-carboxylate,
2:2:6-trimethylpiperidine,
2:2:4:6-tetramethylpiperidine,
1:2:2:4:6-pentamethylpiperidine,
2:2:6:6-tetramethylpiperidine,
1-β-ethoxyethyl-2:2:6:6-tetramethylpiperidine,
4-phenyl-2:2:6:6-tetramethylpiperidine,
4-hydroxy-2:2:6:6-tetramethylpiperidine,
4-keto-2:2:6:6-tetramethylpiperidine,
4-amino-2:2:6:6-tetramethylpiperidine,
4-γ-diethylaminopropylamino-2:2:6:6-tetramethylpiperidine,
4-hydroxy-1:2:2:6:6-pentamethylpiperidine,
4-ethyl-4-hydroxy-2:2:6:6-tetramethylpiperidine,
4-cyano-4-hydroxy-2:2:6:6-tetramethylpiperidine,
4-acetoxy-1:2:2:6:6-pentamethylpiperidine,
2:6-diethyl-1:2:3:6-tetramethylpiperidine,
4-ethyl-2:2:6:6-tetramethylpiperidine,
2:2:6-trimethyl-$\Delta^{3,4}$ or $^{4,5}$-tetrahydropyridine,
1:2:2:6-tetramethyl-$\Delta^{3,4}$ or $^{4,5}$-tetrahydropyridine,
1,2:2:6:6-pentamethyl-$\Delta^{3,4}$-tetrahydropyridine,
2:2:6:6-tetramethyl-$\Delta^{3,4}$-tetrahydropyridine,
4-ethyl-$\Delta^{3,4}$-2:2:6:6-tetrahydropyridine and
2:2:4:6:6-pentamethyl-$\Delta^{3,4}$-tetrahydropyridine.

The piperidine derivatives used as active ingredients in the compositions of this invention may be obtained according to the known art for example by (a) reduction of the corresponding 4-piperidones by the methods of Clemmensen or Wolff-Kishner, (b) reduction of the corresponding tetrahydropyridine derivatives which themselves may be obtained by dehydration of the corresponding 4-piperidols which are formed by controlled reduction of the 4-piperidones or by treating the 4-piperidones with a Grignard reagent or with an acetylenic compound, or (c) by N-alkylation or N-alkenylation using alkylating agents such as alkyl or alkenyl halides, sulphates or sulphonates such as methyl iodide, diethyl sulphate, allyl bromide and methyl p-toluenesulphonate. Other alkylating agents may be ethylene chlorohydrin or, particularly when the N-methyl derivatives are desired, aqueous formaldehyde or a mixture of aqueous formaldehyde and formic acid.

Suitable excipients for use in the compositions of the invention include those known to the art and used in the formulation of pharmaceutical preparations for human and veterinary medication.

The said new pharmaceutical compositions include compositions which are sterile aqueous solutions, suspensions or emulsions, or sterile non-aqueous solutions or suspensions which can be applied in the treatment of hypertension by injection for example intravenously, subcutaneously or intramuscularly. Such sterile injectable solutions or emulsions comprise preferably between 0.05% and about 20% by weight of the said active ingredient or ingredients and the said sterile suspensions comprise preferably between about 10% and about 40% by weight of the said active ingredient or ingredients. Those compositions of the invention which are suspensions contain their particulate matter in a finely divided form, for example in a micropulverised form of particle size substantially below 100 microns, and those compositions which are aqueous suspensions may optionally contain small amounts of such agents as are commonly used to facilitate the manufacture and maintain the efficacy of aqueous suspensions for example dispersing or wetting agents and suspending agents.

Suitable vehicles for the non-aqueous solutions and suspensions of the invention include for example water-miscible non-toxic vehicles for example propylene glycol and polyethylene glycol and water-immiscible non-toxic vehicles for example injectable vegetable oils for example arachis oil and olive oil and injectable organic esters for example dibutyl succinate. The said water-immiscible vehicles may also contain metallic soaps for example aluminium stearate.

The injectable solutions, suspensions or emulsions of the invention may be obtained sterile by known procedures, for example by aseptic formulation, by Seitz filtration, by irradiation or by incorporation in the compositions of sterilising agents, or again in suitable cases by heat treatment.

The compositions of the invention include pharmaceutical compositions which are sterile powders comprising the active ingredient or ingredients together with such non-toxic pharmaceutical excipients as are required to provide, on mixing with sterile aqueous media, sterile aqeuous solutions, suspensions or emulsions suitable for parenteral administration.

The said new pharmaceutical compositions also include compositions which are suitable for oral administration. They include for example solid compositions for example tablets, pills, dispersible powders and granules.

The said tablets may contain suitable pharmaceutical excipients such as inert diluents for example calcium carbonate, maize starch, alginic acid or lactose and lubricating agents for example magnesium stearate. Such tablets may optionally be coated by known techniques for example with a sweetening agent and/or a protective material designed to modify the distribution and absorption of the active ingredient in the digestive tract. Such compositions may also be in the form of a tablet wherein the active ingredient is absorbed on to an ion-exchange resin thereby providing for gradual release of the active ingredient from the tablet for example under the acid conditions of the stomach.

The said tablet compositions may be formulated so that for every 100 parts by weight of the composition there is present between about 5 parts and about 50 parts by weight of the active ingredient.

The compositions for oral administration may also include semi-solid or liquid formulations, for example pharmaceutically acceptable emulsions, solutions, suspensions, syrups or elixirs either for administration per se or after confinement in some suitable way for example in capsules. The compositions of the invention also include compositions with foodstuffs or for admixture with foodstuffs.

The compositions of the invention may be applied directly or indirectly in the treatment of hypertension in man and animals.

As stated above, the new pharmaceutical compositions with which this invention is concerned possess valuable therapeutic properties and in particular they possess ganglion-blocking and hypotensive properties such as to render them of value in the treatment of hypertension. The said compositions may be used in combination with known drugs for example meprobamate, reserpine and aspirin. The bases and the acid-addition salts thereof used in the above compositions are generally long-acting and are particularly suitable for the treatment of hypertensive states while the quaternary salts used in the above compositions are highly active and short-acting and are more suitable for controlled hypotension in surgical procedures.

The invention is illustrated but not limited by the following examples in which the parts are by weight:

*Example 1*

10 parts of 2:2:6:6-tetramethylpiperidine maleate are dissolved in 100 parts of distilled water containing 0.2 part of chlorocresol and the solution is sterilized by heating in an autoclave at a pressure of 10–15 lbs. per square inch during 30 minutes. There is thus obtained a sterile solution suitable for parenteral administration for therapeutic purposes.

When the 2:2:6:6-tetramethylpiperidine maleate used as starting material is replaced by 1:1:2:2:6-pentamethylpiperidinium iodide there is likewise obtained a sterile solution suitable for parenteral administration for therapeutic purposes.

*Example 2*

2 parts of 2:4:6:6-tetramethylpiperidine hydrochloride are dissolved in 100 parts of distilled water containing 0.2 part of chlorocresol and the solution is sterilized by heating in an autoclave at a pressure of 10–15 lbs. per square inch during 30 minutes. There is thus obtained a sterile solution suitable for parenteral administration for therapeutic purposes.

When the 2:4:6:6-tetramethylpiperidine hydrochloride used as starting material is replaced by 1:1:2:2:6:6-hexamethylpiperidinium iodide, there is likewise obtained a sterile solution suitable for parenteral administration for therapeutic purposes.

*Example 3*

To a mixture of 2 parts of polyoxyethylene sorbitan mono-oleate, 3.0 parts of sorbitan mono-oleate and 25 parts of olive oil in which is dissolved 1 part of 2:4:6:6-tetramethylpiperidine oleate and 0.004 part of nordihydroguariaretic acid, are added, with stirring, 20 parts of water in which are dissolved 0.015 part of methyl p-hydroxybenzoate and 0.005 part of propyl p-hydroxybenzoate. The emulsion so formed is homogenised by passage through a conventional homogeniser and there is thus obtained an emulsion suitable for parenteral administration for therapeutic purposes. Also, by the incorporation of a suitable flavouring agent for example 0.02 part of pineapple flavour and a suitable sweetening agent for example 0.005 part of sodium saccharin, there is obtained an emulsion suitable for oral administration for therapeutic purposes.

*Example 4*

A solution is prepared by dissolving 1.5 parts of methyl p-hydroxybenzoate, 0.2 part of propyl p-hydroxybenzoate, 1 part of polyoxyethylene sorbitan mono-oleate, 5 parts of refined soya bean licithin and 8 parts of polyvinylpyrrolidone in 1000 parts of distilled water. The aqueous vehicle so obtained is sterilised by heating in an autoclave at 10–15 lbs. pressure. 300 parts of sterile micropulverized 2:4:6:6-tetramethylpiperidine cinnamate are then added to the cooled aqueous vehicle and the resulting mixture is ball-milled for 15 minutes. There is thus obtained a suspension suitable for parenteral administration for therapeutic purposes.

*Example 5*

A mixture of 2 parts of aluminium stearate and 98 parts of arachis oil is heated slowly with stirring to a temperature of 120° C. The temperature is maintained at this value for 1 hour when gelling is complete and is then raised to 150° C. and maintained thereat for 1 hour. The gel is then cooled and 10 parts of sterile micropulverised 2:4:6:6-tetramethylpiperidine cinnamate are incorporated therein with stirring. There is thus obtained a suspension suitable for intramuscular injection for therapeutic purposes.

Example 6

A mixture of 5 parts of 2:2:6:6-tetramethyl piperidine hydrochloride, 75 parts of calcium carbonate and 19 parts of maize starch is granulated by admixture with a sufficient quantity of 10% aqueous maize starch paste. The granules are passed through a 16-mesh screen and are then dried at 50–55° C. The granules are again passed through a 16-mesh screen and 1 part of magnesium stearate is then added and the mixture is compressed. There are thus obtained tablets suitable for oral administration for therapeutic purposes.

Example 7

A mixture of 10 parts of 2:2:6:6-tetramethyl-4-hydroxypiperidine hydrochloride and 70 parts of calcium carbonate is granulated by admixture with a sufficient quantity of 10% aqueous maize-starch paste. The granules are passed through an 8-mesh screen and after drying at 50–55° C. they are then coated with a sufficient quantity of a solution of 15 parts of shellac and 3 parts of castor oil in 800 parts of ethyl alcohol. 1 part of magnesium stearate is then added to the granules after which the mixture is compressed to give tablets suitable for oral administration for therapeutic purposes.

In a similar manner, tablets suitable for oral administration for therapeutic purposes are obtained when the 2:2:6:6-tetramethyl-4-hydroxypiperidine hydrochloride used as starting material is replaced by one of the following compounds: 4-hydroxy-2:2:6-trimethylpiperidine hydrochloride, 4-hydroxy-1:2:2:6:6-pentamethylpiperidine hydrochloride, 4-ethyl-4-hydroxy-2:2:6:6-tetramethylpiperidine hydrochloride or 1-$\beta$-hydroxyethyl-2:2:6:6-tetramethylpiperidine hydrochloride.

Example 8

100 parts of granules of a sulphonated cross-linked polystyrene resin in hydrogen form are stirred with a solution of 3 parts of 2:2:6:6-tetramethylpiperidine in 180 parts of ethanol and 750 parts of water. After complete absorption the granules are dried and then mixed with 10 parts of maize starch. The mixture is precompressed into granules which are sieved through an 8-mesh sieve and compressed into tablets suitable for oral administration for therapeutic purposes.

Example 9

0.15 part of methyl p-hydroxybenzoate and 0.06 part of propyl p-hydroxybenzoate are dissolved in 40 parts of propylene glycol. 0.15 part of lemon oil is dissolved in the solution which is then added to a solution of 1 part of 2:2:6:6-tetramethyl-4-hydroxypiperidine hydrochloride in 180 parts of water. A slurry of 0.05 part of sodium carboxymethylcellulose in 20 parts of propylene glycol is added with stirring and to the homogeneous mixture is finally added 60 parts of Syrup B.P. There is thus obtained a formulation suitable for oral administration for therapeutic purposes.

Example 10

5 parts of 2:2:6:6-tetramethylpiperidine hydrochloride are mixed with 100 parts of calcium carbonate. The mixture is filled into suitable hard gelatine capsules and there is obtained a pharmaceutical composition suitable for oral administration for therapeutic purposes.

Example 11

2 parts of 2:2:6:6-tetramethylpiperidine oleate are mixed with 100 parts of peanut oil. The mixture is filled into suitable soft gelatine capsules and there is obtained a pharmaceutical composition suitable for oral administration for therapeutic purposes.

When the 2:2:6:6-tetramethylpiperidine oleate used as starting material is replaced by 2:6-diethyl-2:3:6-trimethylpiperidine oleate or 4-acetoxy-1:2:2:6:6-pentamethylpiperidine oleate there are likewise obtained compositions suitable for oral administration for therapeutic purposes.

Example 12

5 parts of 2:2:6:6-tetramethyl-4-piperidone citrate are dissolved in a mixture of 80 parts of water and 250 parts of glycerol. A solution of a suitable essential oil as flavouring agent for example oil of lemon in 100 parts of alcohol is added. By the further addition of 380 parts of Syrup B.P. and colouring material, there is obtained a solution suitable for oral administration for therapeutic purposes.

Example 13

A mixture of 250 parts of 2:2:6:6-tetramethylpiperidine hydrochloride, 75 parts of maize starch and 195 parts of lactose is granulated by admixture with a sufficient quantity of aqueous 10% maize-starch paste. The granules so obtained are passed through a 12-mesh screen and then dried at 50–55° C. 5 parts of magnesium stearate are then added to the granules and the mixture is compressed to give tablets which are suitable for oral administration for therapeutic purposes.

In a similar manner, tablets suitable for oral administration for therapeutic purposes are obtained when the 2:2:6:6-tetramethylpiperidine hydrochloride used as starting material is replaced by one of the following compounds: 1:1:2:2:6-pentamethylpiperidinium iodide, 1:1:2:2:6:6-hexamethylpiperidinium iodide, 2:2-dimethyl-6-isopropylpiperidine hydrochloride, 1-allyl-2:2:6-trimethylpiperidine hydrochloride, 1:2:2:6-tetramethyl-$\Delta^{3,4\ or\ 4,5}$-tetrahydropyridine hydrochloride or 1:2:2:6:6-pentamethyl-$\Delta^{3,4}$-tetrahydropyridine hydrochloride.

Example 14

A mixture of 2500 parts of 2:2:6:6-tetramethylpiperidine hydrochloride, 25 parts of reserpine, 1250 parts of maize starch, 2700 parts of lactose and 10 parts of magnesium stearate is compressed. The compressed material is then crushed and passed through a 16-mesh screen. The granules thus obtained are compressed into tablets which are suitable for oral administration for therapeutic purposes.

In a similar manner, tablets suitable for oral administration for therapeutic purposes are obtained when the 2:2:6:6-tetramethylpiperidine hydrochloride used as starting material is replaced by one of the following compounds: 2:2:6-trimethylpiperidine hydrochloride, 2:2:6:6-tetramethyl-1-$\beta$-(3':4':5'-trimethoxybenzoyloxy) ethylpiperidine hydrochloride, 1-ethyl-2:2:6-trimethylpiperidine hydrochloride, 1:2:2:6-tetramethyl-4-piperidyl xanthene-9-carboxylate hydrochloride, 4-ethyl-2:2:6:6-tetramethylpiperidine hydrochloride, 2:2:6-trimethyl-$\Delta^{3,4\ or\ 4,5}$-tetrahydropyridine hydrochloride or 2:2:4:6:6-pentamethyl-$\Delta^{3,4}$-tetrahydropyridine hydrochloride.

Example 15

A mixture of 25 parts of 2:2:6:6-tetramethylpiperidine hydrochloride, 400 parts of meprobamate, 30 parts of maize starch and 5 parts of lactose is granulated with a sufficient quantity of aqueous 10% maize-starch paste. The granules so obtained are passed through a 12-mesh screen and dried at 50–55° C. 5 parts of magnesium stearate are then added to the granules and the mixture is compressed to give tablets which are suitable for oral administration for therapeutic purposes.

Example 16

A mixture of 250 parts of 1:2:2:6:6-pentamethylpiperidine hydrochloride, 125 parts of maize starch, 270 parts of lactose and 1 part of magnesium stearate is compressed and the compressed material is then broken down into granules by passage through a 16-mesh screen. The granules so obtained are then compressed into tablets which are suitable for oral use for therapeutic purposes.

*Example 17*

A mixture of 25 parts of 1:2:2:6:6-pentamethylpiperidine hydrochloride, 325 parts of acetyl salicylic acid, 32.5 parts of citric acid and 130 parts of maize starch is granulated by admixture with a sufficient quantity of ethanol. The granules are dried at 50° C. and then sieved through a 16-mesh screen. The sieved material is mixed with 100 parts of calcium carbonate, 65 parts of lactose and 7 parts of magnesium stearate and the mixture so obtained is compressed into tablets which are suitable for oral use for therapeutic purposes.

*Example 18*

25 parts of 1-ethyl-2:2:6:6-tetramethylpiperidine succinate and 1 part of chlorocresol are dissolved in 500 parts of pyrogen-free water. The solution is filled into ampoules which are sealed and then heated in an autoclave at 15 lbs. pressure for 30 minutes. There is thus obtained a sterile solution which is suitable for parenteral administration for therapeutic purposes.

*Example 19*

A mixture of 25 parts of 1-ethyl-2:2:6:6-tetramethylpiperidine succinate, 7.5 parts of maize starch and 15 parts of lactose is granulated by admixture with a sufficient quantity of aqueous 10% maize-starch paste. The granules are then dried at 50° C. and sieved through a 16-mesh screen. 0.5 part of magnesium stearate is added to the sieved mixture which is then compressed to give tablets which are suitable for oral use for therapeutic purposes.

What we claim is:

1. A solid therapeutic composition in dosage unit form suitable for oral administration and comprising a non-toxic, orally acceptable solid pharmaceutical carrier and, as active ingredient, at least one compound selected from the group consisting of 1:2:2:6:6-pentamethylpiperidine, its non-toxic pharmaceutically acceptable acid addition salts and the methiodide quaternary salt thereof, said active ingredient comprising from 5 to 50% by weight of said composition.

2. A sterile therapeutic composition in dosage unit form suitable for parenteral administration and comprising water, a bacteriostat and, as active ingredient, at least one compound selected from the group consisting of 1:2:2:6:6-pentamethylpiperidine, its non-toxic pharmaceutically acceptable acid addition salts and the methiodide quaternary salt thereof, said active ingredient comprising from 0.05% to 40% by weight of said composition.

3. A therapeutic composition in dosage unit form comprising a non-toxic, orally acceptable liquid pharmaceutical carrier, a sweetening agent, a suspending agent and, as active ingredient, at least one compound selected from the group consisting of 1:2:2:6:6-pentamethylpiperidine, its non-toxic pharmaceutically acceptable acid addition salts and the methiodide quaternary salt thereof, said active ingredient comprising from about 10% to 40% by weight of said composition.

4. A solid therapeutic composition in dosage unit form suitable for oral administration and comprising a non-toxic, orally acceptable solid pharmaceutical carrier and, as active ingredient, at least one compound selected from the group consisting of 2:2:6:6-tetramethylpiperidine, its nontoxic pharmaceutically acceptable acid addition salts and the methiodide quaternary salt thereof, said active ingredient comprising from 0.05% to 40% by weight of said composition.

5. A therapeutic composition in dosage unit form comprising a nontoxic, orally acceptable liquid pharmaceutical carrier, a sweetening agent, a suspending agent and, as active ingredient, at least one compound selected from the group consisting of 2:2:6:6:-tetramethylpiperidine, its nontoxic pharmaceutically acceptable acid addition salts thereof and the methiodide quaternary salt thereof, said active ingredient comprising from about 10% to 40% by weight of said composition.

6. The method for the treatment of hypertension which comprises administering to a hypertensive subject a compound selected from the group consisting of 1:2:2:6:6-pentamethylpiperidine, its nontoxic, pharmaceutically acceptable acid addition salts and the methiodide quaternary salt thereof, said compound being employed at a dosage rate effective to reduce the blood pressure of the subject.

7. The method for the treatment of hypertension which comprises administering to a hypertensive subject a composition which comprises, as an active ingredient a member of the class consisting of 2:2:6:6-tetramethylpiperidine, its nontoxic, pharmaceutically acceptable acid addition salts, and the methiodide quaternary salt thereof, in association with a pharmaceutical carrier, said composition being employed at a dosage rate effective to reduce the blood pressure of the subject.

References Cited in the file of this patent

UNITED STATES PATENTS 2,596,450     Wachter                May 13, 1952

OTHER REFERENCES

Fischer: Deutsch Chemische Gesellschaft (Berichte), vol. 16, pp. 1604–1606 (1883).

Gough: J. Chem. Soc. (London), 1928, pp. 2426–47, abstracted from Chem. Abst., vol. 23, p. 92 (1929).

Beilstein: Beilstein Handbuch der Organischen Chemie, vol. XX (original, 1935, pp. 125 and 129).

Karrer: Organic Chemistry, 2nd Ed., Elsevier Publishing Company Inc., p. 169 (1946).

Matter: Helv. Chim. Acta, vol. 31, pages 612–622 (1948).

Leonard: Jour. Amer. Chem. Soc., vol. 71, pp. 2808–13 (1949).

Cusic et al.: Journal or Organic Chemistry, vol. 16, page 1929 (1951).

Beilstein: volume XX (2nd Supp.), 1953, pp. 64–65.

Hancox: Australian J. Chem., vol. 6, pp. 143–151 (1953), abstracted from Chem. Afst., vol. 48, column 2709 (1954).

Leonard et al.: J.A.C.S., vol. 79, p. 5279, Oct. 5, 1957.

Hall J.A.C.S, vol. 79, p. 5447, October 20, 1957.